Patented Aug. 22, 1950

2,519,755

UNITED STATES PATENT OFFICE 2,519,755

THIODIPROPIONATES—POLYTHENE ANTIOXIDANTS

Myers F. Gribbins, Wilmington, Del., assignor to E. I. du Pont de Nemours & Company, Wilmington, Del., a corporation of Delaware No Drawing. Application September 25, 1946, Serial No. 699,341

3 Claims. (Cl. 260—45.85)

This invention relates to new compositions of matter and particularly to new compositions of matter comprising polymers of ethylene.

The polymers of ethylene are made by, for example, the processes of U. S. Patents 2,153,553 or 2,188,465, or by contacting ethylene with water and a peroxy compound catalyst, preferably a diacyl peroxide or a dialkyl dioxide, at temperatures of from 40 to 350° C. and at pressures in excess of atmospheric, preferably in the range of 50 to 3000 atmospheres. The polymers of ethylene, corresponding in composition substantially to $(CH_2)_x$, in which $x$ is 50 to 100 or more, vary in properties from liquids to solids and soften or melt between about 100° C. and about 120° C., their melting point being substantially independent of their molecular weight.

It is an object of this invention to provide compositions comprising ethylene polymers which have improved physical and electrical stability. Another object is to provide compositions comprising ethylene polymers which in the form of self-supporting films, molded articles, fibers, or coatings, are stabilized against degradation. Still another object is to provide new compositions comprising as a major component, ethylene polymers, and as a minor component, an ester of beta-thiodipropionic acid. Other objects will appear hereinafter.

The above objects are accomplished according to this invention by incorporating into a normally solid ethylene polymer a small amount of a beta-thioether of an ester of propionic acid having the formula

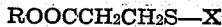

ROOCCH₂CH₂S—X in which R is an alkyl or a cycloalkyl radical such as n- and isobutyl, amyl, heptyl, nonyl, decyl, lauryl, glycyl, cinnamyl, capryl, benzyl, allyl, cetyl, stearyl, palmityl, cyclohexyl, and similar groups, and X is:

1. A hydrocarbon group such as e. g.: the alkyl groups: methyl, ethyl, propyl, butyl, lauryl, and the aryl groups: phenyl, naphthyl, benzyl; and such groups as p methoxy phenyl, p hydroxy phenyl and cyclohexyl.

2. An oxygenated-hydrocarbon group such as e. g. the alcohol groups: hydroxymethyl, hydroxyethyl, and hydroxybutyl; the ether groups: methoxymethyl, methoxyethyl, and ethoxyethyl; the acid groups and the R esters thereof: carboxymethyl, carboxyethyl, carboxypropyl and carboxybutyl; and the aldehyde groups such as aldehydoethyl.

3. A sulfur-hydrocarbon group such as e. g.: mercaptoethyl, mercaptopropyl, mercaptobutyl, mercaptoisobutyl, mercaptohexyl and ethiaethyl.

4. A sulfur- and oxygenated-hydrocarbon group such as e. g.:

Carboxyethiaethyl, —CH₂CH₂SCH₂CH₂COOH;
Carboxyethiaethdithiaethyl,
  —CH₂CH₂SSCH₂CH₂SCH₂CH₂COOH;
Carboxyethiaisobutyl,
  —CH₂CH₂CH(CH₃)SCH₂CH₂COOH; and
Carboxyethiapropyl,
  —CH₂CH₂CH₂SCH₂CH₂COOH, and 5. A sulfur-, nitrogen-hydrocarbon group such as e. g.: 3-benzothiazyl mercaptopropionic acid, which compounds are more specifically described in the Gribbins, Miller and O'Leary patent, U. S. 2,397,960.

These esters may be mixed with the polymer in any suitable manner that will effect thorough distribution. This can be accomplished in a machine suitable for mixing solids or incorporating liquids, as by milling the ethylene polymer with the addition agent on heated rolls, such as are used in the compounding of rubber, or on other suitable milling or mixing equipment, such for example, as the Banbury mixer. Instead of adding the agent to the polymer in the solid or molten state, it can be added to a solution or suspension of polymer in an organic solvent or to an aqueous dispersion thereof and the volatile solvent subsequently removed by vaporization.

In general, the amount of agent to be added to the ethylene polymer depends upon the degree and kind of stabilization desired. The amount of agent added can vary from 0.001% to 5.0% based on the weight of the ethylene polymer, but as a rule it is preferred to use the minimum amount required to achieve the desired results. The amount commonly used will vary from 0.005 to 2.0 parts by weight per hundred parts ethylene polymer.

In one form of practicing the invention, the ethylene polymer, such, for example, as a solid polymer having a molecular weight of about 4,000, is dissolved in a hot organic hydrocarbon solvent, e. g., xylene, and to this solution is added the ester in amount sufficient to give the desired amount of the agent, based on the weight of the polymer. These solutions are cast on steel plates; the thickness of the film is adjusted so as to give a dry film of about 1 mil in thickness; the solvent is removed by evaporation, and, after drying, the film is stripped from the plate.

The examples which follow illustrate the utility and the outstanding advantages of this invention:

*Example 1.*—A solid polymer of ethylene obtained by polymerization at a temperature of about 200° C., a pressure of about 1000 atmospheres and in the presence of a peroxide catalyst and having a molecular weight of at least 4,000 was worked on the rolls of a steam heated rubber mill until a continuous sheet was formed. This required about 0.5 minute at roll temperatures of 170° C. Sufficient dilauryl beta-thiodipropionic acid was then sprinkled on the mill bank to give 0.2% thereof based on the polymer. The milling was continued at 170° C., material being removed from the mill at intervals, compression molded into a suitable shape, and the power factor of the compound determined. Duplicate samples of polymer were treated. In one case, no ester was added; in another, 0.2% thiodipropionic acid; and, in another, 0.2% distearyl thiodipropionate.

TABLE I

*Effect of milling at 170° C. of polyethenes with TDP stabilizers on power factor at 106 mc.*

| Stabilizer | None | 0.2% TDP[1] Acid | 0.2% Di "stearyl" TDP | 0.2% Di "lauryl" TDP |
|---|---|---|---|---|
| Power Factor×10[4]: Milled: | | | | |
| 3 Min | 1.8 | 1.7 | 2.8 | 3.2 |
| 10 Min | 2.8 | 2.85 | 3.1 | 3.6 |
| 20 Min | 5.6 | 4.0 | 4.1 | 3.2 |
| 30 Min | 8.2 | 7.1 | 5.3 | 2.6 |
| 45 Min | 12.1 | 11.4 | 4.6 | 3.4 |
| 60 Min | 19.0 | 17.9 | 5.3 | 4.0 |

[1] TDP acid=thiodipropionic acid.
Di"stearyl" TDP=impure stearyl alcohol ester of TDP.
Di"lauryl" TDP=Mixture of higher alcohol esters (mostly lauryl alcohol) of TDP.

*Example 2.*—On outdoor exposure tests the superiority of the protected polymers over the unprotected polymers is evident from the data of Table II, the agent having been incorporated in the polymer of this table substantially in accord with the process as described in Example 1.

TABLE II

*Results of Wilmington outdoor exposure test of polythene with di "lauryl" TDP*

| Inhibitor | None, Control | | | 1% Di"lauryl" TDP | | |
|---|---|---|---|---|---|---|
| Exposure | None | 21 Wks. Nov.–April | 34 Wks. Nov.–July | None | 21 Wks. Nov.–April | 34 Wks. Nov.–July |
| Cold Brittleness, Temp., °C | OK-72 | OK-72 | −7 | OK-72 | OK-72 | OK-72 |

The di-higher alkyl beta-thiodipropionates and especially the dilauryl and distearyl esters have been found to be outstanding in their ability both to protect the polymers of ethylene from degradation on exposure to the elements and to preserve their valuable electrical low-loss characteristics at high frequencies during exposure to high temperatures in contact with air.

I claim:

1. A composition of matter comprising a solid ethylene polymer and from 0.001 to 5.0% by weight of dilauryl beta-thiodipropionate.

2. A composition of matter comprising as the major component a normally solid polymer of ethylene and from 0.005 to 2.0% by weight of distearyl beta-thiodipropionate.

3. A composition of matter comprising a solid polymer of ethylene and from 0.001 to 5% by weight of a dialkyl ester of beta-thiodipropionic acid.

MYERS F. GRIBBINS.

REFERENCES CITED

The following references are of record in the file of this patent:

UNITED STATES PATENTS

| Number | Name | Date |
|---|---|---|
| 2,140,545 | Pier | Dec. 20, 1938 |
| 2,397,960 | Gribbins et al. | Apr. 9, 1946 |

OTHER REFERENCES

Polythene, by Hahn et al., Ind. & Eng. Chem., vol. 37, June 1945, pages 530–531.